United States Patent

[15] 3,688,025

[45] Aug. 29, 1972

Whittemore, Jr.

[54] RECORDER AND PLAYBACK APPARATUS FOR PULSE WIDTH MODULATED RECORD

[72] Inventor: Maurice James Whittemore, Jr., New Palestine, Ind.

[73] Assignee: RCA Corporation

[22] Filed: Oct. 27, 1970

[21] Appl. No.: 84,356

[52] U.S. Cl. ......178/6.6 R, 178/6.7 A, 179/100.3 G, 346/77 R

[51] Int. Cl. ..........................G11b 11/18, H04n 5/86

[58] Field of Search .........178/6.7 A, 6.6 TP, 5.4 BD; 179/100.3 B, 100.3 G, 100.3 T; 340/173 TP; 346/77 E, 77 R

[56] References Cited

UNITED STATES PATENTS

| | | | |
|---|---|---|---|
| 3,335,219 | 8/1967 | Goldmark | 178/6.7 A |
| 3,583,804 | 6/1971 | Mueller | 178/5.4 BD |
| 3,210,466 | 10/1965 | Day | 178/6.6 TP |
| 3,461,229 | 8/1969 | Oppenheimer | 178/6.6 TP |

*Primary Examiner*—Howard W. Britton
*Attorney*—Eugene M. Whitacre

[57] ABSTRACT

An information record comprises a tape containing the information, which may be audio information, as width modulation of periodic depth variations extending generally across the tape. An information playback unit illuminates the tape and detects the information which is contained in light diffracted by the tape.

12 Claims, 8 Drawing Figures

INVENTOR.
Maurice J. Whittemore Jr.
BY
[signature]
ATTORNEY

INVENTOR.
Maurice J. Whittemore Jr.
BY
Paul J. Rasmussen
ATTORNEY

RECORDER AND PLAYBACK APPARATUS FOR PULSE WIDTH MODULATED RECORD

BACKGROUND OF THE INVENTION

This invention relates to an information record and systems for producing and reproducing the information on the record.

It is desirable to have information records, such as a sound record, which are compact, easy to produce, durable, have high information resolution and are inexpensive. With regard to sound information records it is known that various format records may be adapted to contain the sound information. For example, the sound record may comprise a flat disc record containing sound as width and depth modulation of a spiral groove in the record. The sound record may also be in the form of magnetic tape. Also, the sound record may be in the form of a variable area of a variable density format such as on a motion picture film sound track. For many purposes the above described types of sound records are suitable, but none of these records possesses all of the desirable characteristics of a sound record as described above.

It is desirable to include a sound record along with a video recording. In this situation it is desirable that the sound record and video record be made of the same basic material which may be processed in essentially the same manner to facilitate the sound and video recording process and to simplify the playback apparatus for the recorded material as well as to minimize the cost of the complete sound and video record.

A video record is described in copending patent application, Ser. No. 509,100, filed Nov. 22, 1965, by Hendrik J. Gerritsen and David F. Greenaway, entitled "HOLOGRAPH RECORD PRESSINGS." Particularly, the application discloses how a hologram may be made on a deformable medium and how a metal master may be made from the original hologram record. This metal master may then be used to impress the holograms onto other deformable material for making massproduced, inexpensive duplicate record pressings.

An advantageous method of making duplicates of optical or sound recordings is disclosed in copending patent application, Ser. No. 862,019, filed Sept. 29, 1969, by Nathan Feldstein, entitled "METHOD OF MAKING DUPLICATES OF OPTICAL OR SOUND RECORDINGS." In this application it is described how a surface relief pattern in an organic plastic material is transferred to a metal form by sensitizing and activating the plastic surface, depositing a thin layer of nickel or cobalt thereon using a catalytic deposition process, backing up the thin metal layer with a heavier electrolytic deposit and separating the nickel or cobalt surface from the plastic surface and using the metal replica to mold or press duplicate copies in a deformable plastic.

The techniques described in the two above-mentioned copending applications are useful in that they can be utilized for making a metal master of a relief pattern, which master may then be used for the mass production of duplicate recordings.

An object of the invention is to provide an information record containing the information as width modulation of periodic depth variations extending generally across the record.

Another object is to provide a playback unit for the above-described record.

Another object is to provide a playback unit for the above-described record, wherein the record contains sound information adjacent a video information portion.

An information record contains information recorded as width modulation of periodic depth variations of the record whereby upon illumination the information is contained in light diffracted by the record.

In one embodiment the invention comprises a multichannel sound record containing the sound information as width modulation of periodic depth variations of a tape, the information for first and second channels being contained as width modulation of depth variations extending across the tape at respective first and second angles measured from a reference line extending in the direction of travel of the tape.

Apparatus for producing electrical signals representative of information contained as width modulation of depth variations of a record comprises a source of light directed as a relatively narrows elongated beam to a plane containing an information record. Means are provided for moving the record relative to the light beam. Light detecting means produces electrical signals representative of the modulated diffracted light from the record. Signal processing means separate the information signals from signal components representative of the periodic depth variations of the record.

A more detailed description of several embodiments is given in the following specification and accompanying drawings of which:

FIGS. 1*a*–1*d* illustrate the relationship between modulation waveforms and a sound record containing the modulation information;

DESCRIPTION OF THE INVENTION

Figures 1A, 1B, 1C, 1D:
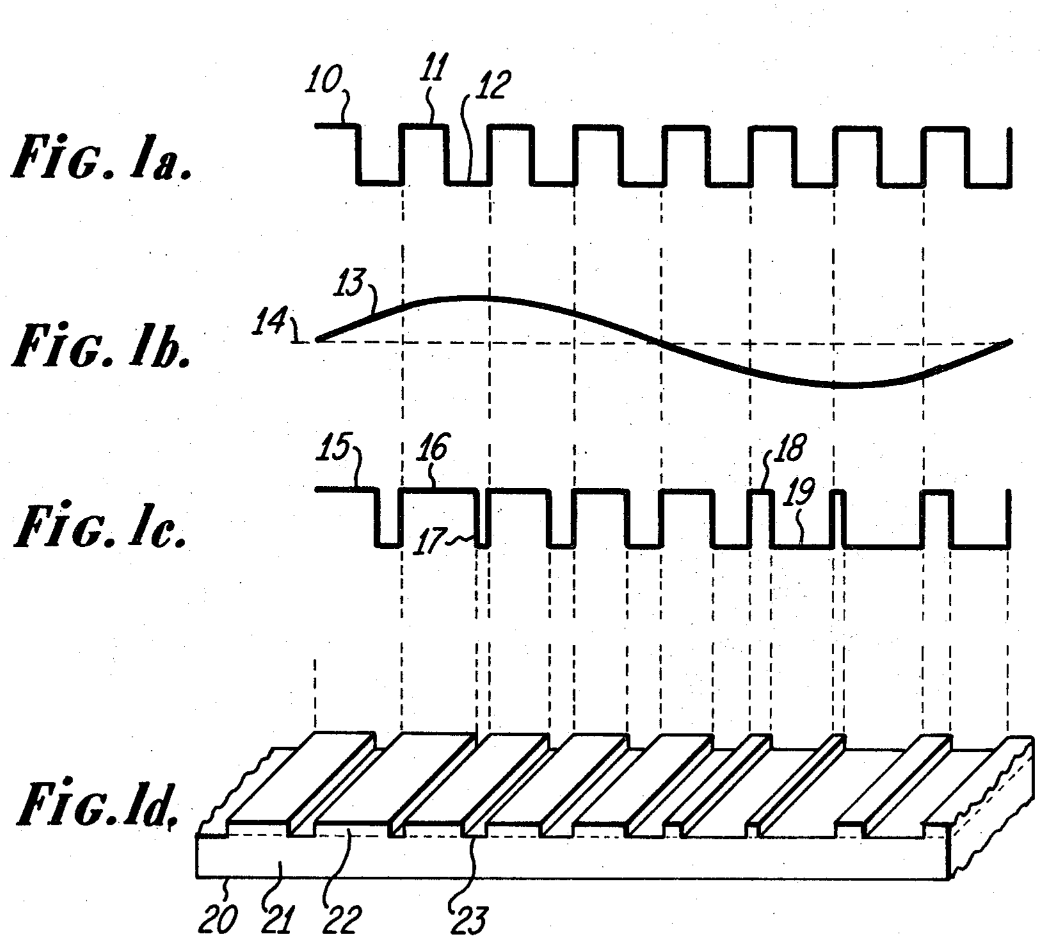

FIGS. 1*a*–1*d* illustrate the relationship between carrier and modulation waveforms and a sound record containing modulation information. FIG. 1*a* shows a periodic carrier waveform which has been amplitude limited so as to be essentially a square wave 10 having equal positive half cycles 11 and negative half cycles 12 and a period as indicated by the dotted vertical lines. FIG. 1*b* shows a modulation waveform 13 having positive and negative alternations about an AC axis 14. Waveform 13 may be a waveform representative of audio information. For purposes of explanation, waveform 13 is shown as a simple sine wave. The frequency of waveform 10 of FIG. 1*a* is greater than twice the highest frequency of the audio information waveform 13 of FIG. 1*b*. FIG. 1c illustrates a waveform 15 such as obtained from a conventional pulse width modulator having as its input waveforms the carrier waveform 10 of FIG. 1*a* and the audio information waveform 13 shown in FIG. 1*b*. It should be noted that the period of waveform 15 is the same as the period of the waveform 10 in FIG. 1*a*. However, the symmetrical positive and negative portions of waveform 10 have been altered in accordance with audio information modulation waveform 13 so that the positive and negative portions of each cycle of waveform 15 are no longer equal. Thus, in a portion of the waveform 15 in which waveform 13 is positive, the positive portion 16 of a cycle of waveform 15 is greater than the negative portion 17. In that portion of waveform 15 during which modulation waveform 13 is negative the positive portion 18 of a cycle of waveform 15 has a lesser width than a negative portion 19. Thus, the carrier waveform 10 of FIG. 1*a* has been pulse width modulated in a conventional manner by the audio information waveform 13 of FIG. 1*b* to yield the pulse width modulated waveform 15 of FIG. 1*c*.

As will be explained subsequently, the waveform 15 of FIG. 1*c* is utilized with apparatus to modulate a light beam to selectively expose a photosensitive portion of a recording tape moving relative to the light beam.

FIG. 1*d* illustrates a recording tape 20 having a substrate 21 and a photosensitive surface 22 on one side thereof. The effect of exposing the photosensitive surface 22 to the modulated light beam and subsequent developing the image on surface 22 is to produce on the surface of the tape indentations 23 in those areas where the light beam exposes the tape and plateaus in the unexposed areas 22 in which the light beam was not incident on the tape. Conventional development of the photosensitive surface of the tape 20, which photosensitive surface may be a photoresist coating, results in depth variations along the tape 20 in accordance with exposure to the modulated light beam.

As shown by the dotted vertical lines interconnecting FIGS. 1*a* through 1*d* the period of the carrier wave 10 of FIG. 1*a* is preserved on the information bearing tape 20. However, the audio modulation is represented on the tape 20 as width modulated depth variations extending generally across the tape. By inspection of FIG. 1*d* it can be seen that after suitable development and upon being illuminated by a relatively narrow elongated beam of light directed parallel to the grooves of the tape 20, the light will be diffracted as determined by the periodic depth variations of the tape 20 and the amount of light diffracted will be determined by the width modulation of the depth variations of the tape.

It should be noted that tape 20 may be transparent in which case a playback beam incident on one side of the tape will cause light emerging from the other side thereof to be diffracted as described. However, it is to be understood that the substrate 21 of tape 20 may include a reflective coating such that the diffracted light will emerge from the same side of the tape that was illuminated by the incident readout beam.

Figure 2:
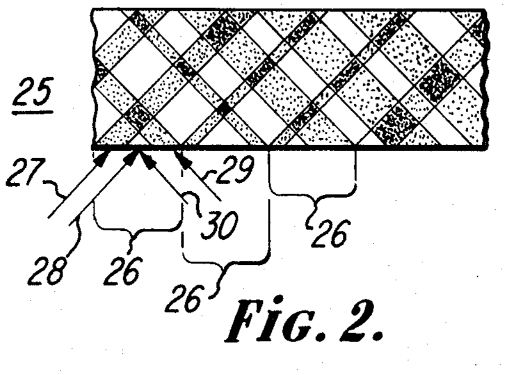
FIG. 2 is a top view of a multichannel sound record embodying the invention.

FIG. 2 is a top view of a multichannel sound recording embodying the invention. The tape 25 of FIG. 2 contains a first channel of sound information containing exposed areas 27 and unexposed areas 28 extending across the tape in a first direction indicated by the arrows. Tape 25 also contains a second channel of sound information contained in exposed areas 29 and unexposed areas 30 extending across the tape in a second direction different from the first as indicated by the arrows. Similar to the tape 20 of FIG. 1*d*, tape 25 has the information contained in periodic portions 26 and has the audio information contained as width modulation of the depth variations in each periodic portion of the tape.

The multichannel sound record described above utilizes superimposed sound tracks to conserve space on the record. Another form a multichannel sound record may have is a side-by-side arrangement in which multiple sound channels are adjacent each other. This latter arrangement occupies more space on the record but it results in less crosstalk between the channels than the superimposed multiple channel record.

Figure 3:
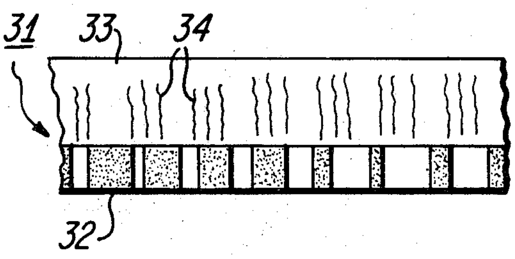
FIG. 3 is a top view of a sound record with an accompanying video record.

FIG. 3 is a top view illustrating a tape 31 having sound record portion 32 with an accompanying video record portion 33. Sound portion 32 of tape 31 is adjacent the video portion 33. Video information is contained in portions 34 and may be holographic in form as disclosed in the copending Gerritsen and Greenaway application. The sound track portion 32 of tape 31 is shown to be similar to the tape 20 of FIG. 1*d*. However, it is to be understood that a multichannel sound record as described in conjunction with FIG. 2 could be substituted for the single channel sound record portion 32 of FIG. 3.

The sound records shown in FIG. 1*d*, FIG. 2 and FIG. 3 and the video portion of the tape shown in FIG. 3 may be duplicated in a manner similar to that described in the copending Feldstein application in which the sound and video information is embossed on a relatively thin transparent plastic tape. In this manner the sound tapes alone or a sound tape with accompanying video may be produced having high resolution, compactness and also may be mass-produced cheaply.

Figures 4, 5:
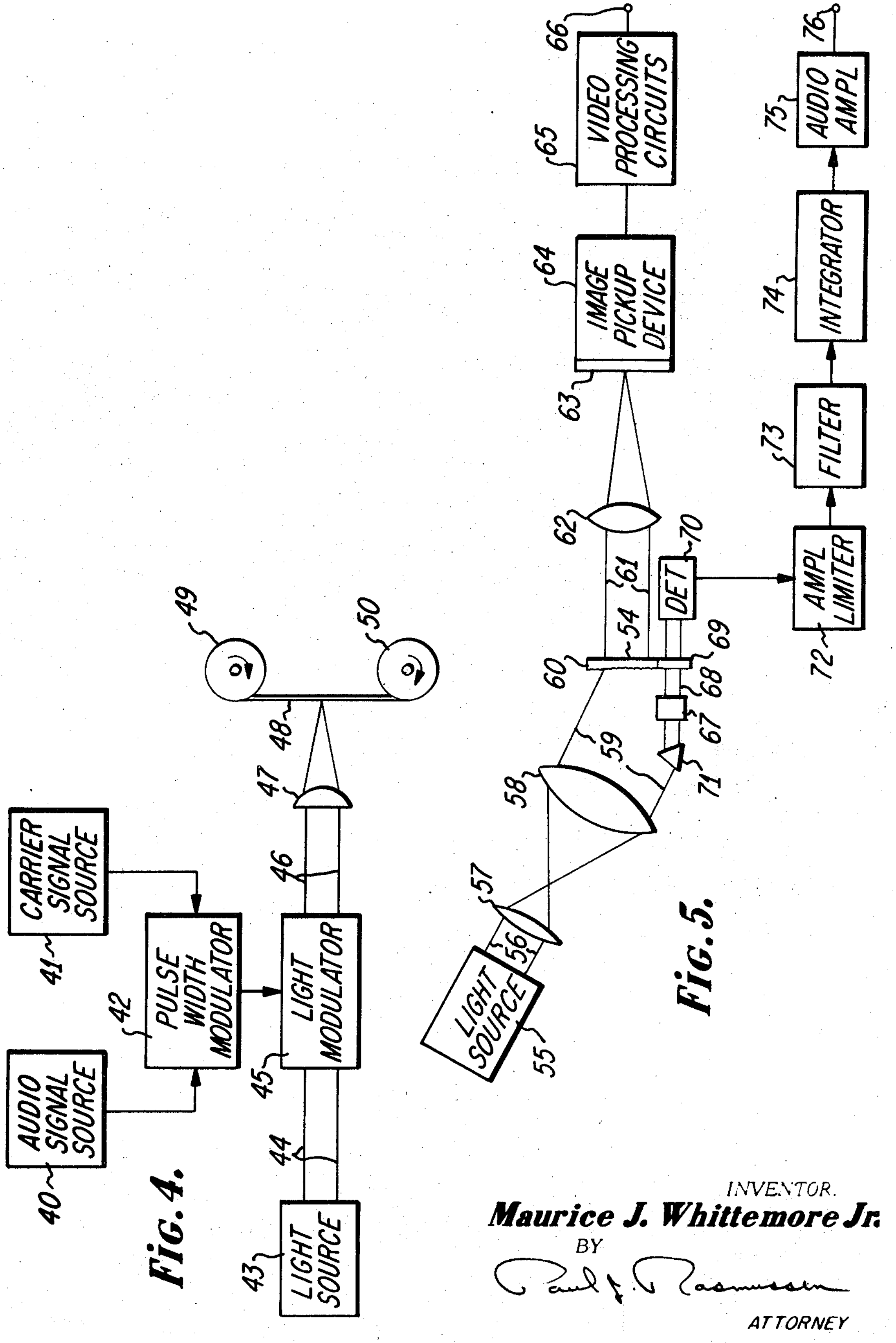
FIG. 4 is a functional diagram of a system for producing the sound record illustrated in FIG. 1*d*.
FIG. 5 is a functional diagram of a system for reproducing sound and video signals from the record illustrated in FIG. 3.

FIG. 4 is a functional diagram of a system for producing the sound record illustrated in FIG. 1*d*. A source of audio signals 40 and a source of carrier signals 41 are coupled to a pulse width modulator 42. The audio signals may be as shown by the waveform 13 in FIG. 1*b* and the carrier signal may be as shown by the waveform 10 in FIG. 1*a*. The pulse width modulator 42 combines the modulation and carrier signals for providing a pulse width modulated wave similar to the wave 15 shown in FIG. 1*c*. This pulse width modulated wave is used as a control signal for a light modulator 45.

A light beam 44 emitted from a light source 43, which may be a laser emitting monochromatic coherent light, is disposed such that the light beam 44 is directed to an aperture of light modulator 45. Light modulator 45 may be an electrostatically controlled light valve or any other suitable type of light valve, the transmission of which is controlled by a control wave applied to its control terminals. The light beam 46 transmitted by light modulator 45 is modulated in accordance with the pulse width modulated control signal. Thus, the light beam 46 comprises a series of periodic pulses of different time duration.

Light beam 46 is directed to a cylindrical lens 47 which focuses the light onto a light sensitive recording tape 48. Tape 48 is fed from a reel 50 and is taken up by a reel 49 by conventional apparatus not illustrated in the diagram. Light sensitive tape 48 may comprise a vinyl polyester or acetate tape having a photoresist coating which is exposed by the focused light beam 46. Cylindrical lens 47 narrows the beam in the direction shown in the diagram such that the width of the beam is smaller than the period of the modulated carrier wave such that the carrier wave and modulation components can be exposed on the photoresist coating of tape 48 with adequate resolution. It should be noted that in the process of recording the carrier wave and the audio modulation on the tape 48 that the carrier wave component, which serves as a diffraction grating upon development of the tape, and the audio information, are recorded on the tape in a single step operation. This has the advantage that the tape does not have to be first processed to contain a diffraction grating before the desired audio modulation is recorded.

The width of the elongated narrow beam 46 focused onto the tape 48 is determined by the resolution requirement of the system and the speed of the tape 48. For example, if it were desired to modulate the tape with an 8 KHz audio signal and the tape were moving at a speed of 6 inches per second, the recording beam should be focused to a width of about 50 microinches. Further, to record an audio signal having a bandwidth of 8 KHz, the carrier signal should have a frequency of at least twice the highest audio frequency, or about 16 KHz. These parameters may be varied as desired depending upon the desired information signal bandwidth and the speed on the recording tape.

Another advantage of utilizing the described pulse width modulation recording apparatus is that noise present in the laser light beam does not appear in the recording. This situation exists because the laser beam is either full-on or full-off, and the exposure of the photoresist can be made such that only the peak energy of the laser beam is utilized whereby the noise, which is small relative to the peak energy, does not expose the photoresist and therefore is not recorded.

As mentioned in the copending Feldstein application, a metal master may be made from the developed recording tape 48 and from the metal master many duplicate tapes may be mass-produced by embossing a thermoplastic or thermo setting tape with the pattern contained on the metal master tape.

FIG. 5 is a functional diagram of a system for reproducing sound and video signals from the record illustrated in FIG. 3. A light beam 56 from a light source 55 which may be a laser emitting monochromatic coherent light is expanded by lenses 57 and 58 into an expanded beam 59 which is directed toward a video information portion 60 of a tape 54 and an audio information portion 69 of the tape. It should be noted that the beam 59 is directed at an angle to the video portion 60 of the tape. As disclosed in the copending Gerritsen and Greenaway application this is the same angle which the reference recording beam made with the tape during the production of the original video holographic recording. A first order diffracted beam 61 is emitted from the tape and is focused by a lens 62 onto a photosensitive electrode 63 of an image pickup device 64. Thus, the video information contained as a holographic relief pattern on tape 54 is imaged onto the pickup device. As the electron beam of image pickup device 64 is scanned across photosensitive electrode 63 by conventional deflection apparatus not shown, an electrical signal corresponding to the video information is obtained from the image pickup device. This electrical signal is coupled to video processing circuits 65 which produces signals representative of the video information contained in the tape. These signals are coupled to an output signal terminal 66 and are suitable for application to a display device such as a television receiver.

A portion of expanded beam 59 impinges upon a wedge type lens 71 which serves to direct the light perpendicular to the tape 54. Light from lens 71 impinges on a cylindrical lens 67 disposed in its path which forms a relatively narrows elongated beam, the length of which is in the plane of the drawing, for illuminating the sound track portion 69 of the tape. Detecting means 70 is disposed behind the tape to intercept the light diffracted by the periodic sound modulated portions of the tape.

The electrical signals representative of the modulated light contained in the diffracted light are representative of the on and off portions of the original pulse width modulated signal utilized in producing the sound record. This signal is coupled to an amplifier limiter 72 which amplifies the signal and limits it above and below the desired signal excursion limits. This limited signal is coupled to a bandpass filter 73 which limits the periodic or carrier portion of the signal and passes only the audio information signal components. These signal components are further filtered by an integrator network 74 so as to produce a more truly representative audio signal representative of the audio modulation contained on the tape. This audio signal is then coupled to an audio amplifier 75 which amplifies the signal to a useful level suitable for driving a load such as a sound loudspeaker coupled to audio signal output terminal 76.

In the embodiment shown in FIG. 5 the sound playback apparatus was shown to include both sound and video playback portions. It is to be understood that the sound portion of the tape could be played back by simpler apparatus not involving a video playback portion.

The multichannel sound record described in conjunction with FIG. 2 may be played back by apparatus similar to that shown in FIG. 5. However, the apparatus shown in FIG. 5 must be changed to include an additional cylindrical lens in addition to cylindrical lens 67 for providing two relatively narrow elongated playback beams, each of which is parallel to the depth variation portion of one of the two sound channels on the tape. Such beams may be provided by disposing two cylindrical lenses making a "V" with each other at the same angle that the two sound channels have in relation to each other on the tape. A separate sound detecting and signal processing channel may be utilized for each sound channel signal. Thus, it would be necessary to duplicate the sound processing apparatus shown in FIG. 5 in a system for playback of a multichannel sound tape containing two sound channels.

In the playback apparatus described in conjunction with FIG. 5 the light source was stated to be monochromatic light obtained from a laser. It should be noted that the sound track may be played back utilizing white light instead of laser light. With a white light arrangement the wedge type lens 71 could be eliminated and white light source could be directed normal to the sound track. Such an arrangement permits the full energy of the laser beam to be utilized for illuminating the video portion of tape 54. In a playback apparatus for a sound record above a white light source would reduce considerably the cost of the playback unit. Whether laser light or white light is utilized in the playback apparatus, the focusing of the beam onto the sound record is not as critical as in the recording apparatus because the playback beam only has to resolve the audio information contained on the record. Also, the described playback apparatus utilizes light very efficiently because no mechanical slits or apertures are utilized to control the cross sectional shape of the beam.

The record described in conjunction with FIG. 2 is a stereo sound record containing two tracks of sound information embossed at about 90° to each other and at about 45° from the longitudinal dimension of the tape. It has been determined that there are advantages to making a single channel sound record having the pulse width modulated portions extend transversely of the tape at an angle other than 90° from the longitudinal dimension of the tape as is shown in FIGS. 1*d* and 3. For example, with the modulated grooves disposed at 45° from the longitudinal dimension the signal-to-noise ratio of the sound signals obtained during playback is about 6db better than for the tape in which the modulated grooves are disposed at 90° to the longitudinal dimension. Further, the first order diffracted light signals contain less scratch noise with this arrangement. The only change necessary to the playback apparatus of FIG. 5 to obtain signals from this tape would be to rotate the aperture of the illuminating beam and to rotate the detector by 45 degrees.

What is claimed is:

1. An information record comprising a tape having said information contained as width modulation of fixed depth grooves, said grooves comprised of first and second edges and extending generally in a direction of the width of said tape, whereby upon being illuminated said information is contained in light diffracted by said width modulated fixed depth grooves.

2. An information record according to claim 1 wherein said tape is transparent.

3. An information record according to claim 2 wherein said modulated grooves have equal spacing between said second edges of adjacent grooves.

4. An information record according to claim 3 wherein said fixed depth grooves are periodic and extend transversely of said tape at an angle of approximately 45 degrees to the longitudinal dimension of said tape.

5. A sound record comprising a transparent tape having sound information contained as width modulation of periodic fixed depth grooves extending generally in a direction of the width of said tape, whereby upon being illuminated said sound information is contained in light diffracted by said periodic width modulated fixed depth grooves.

6. A sound record according to claim 5 wherein the frequency of occurrence of said periodic grooves is greater than the highest frequency of said sound information.

7. A multiple channel sound record comprising a transparent tape including a first sound channel contained as width modulation of first grooves of fixed depth extending across said tape at a first angle measured in one direction from the longitudinal axis of said tape; and a second sound channel contained as width modulation of said grooves of fixed depth extending across said tape angularly disposed to said second grooves, whereby upon being illuminated sound information from said channels is contained in light diffracted by said first and second grooves.

8. A multiple channel sound record according to claim 7 wherein said grooves are periodic and the frequency of occurrence of said periodic grooves in each of said channels is greater than the highest frequency of sound information in said channels.

9. Apparatus for producing electrical signals from a multiple channel sound record including first and second sound channels contained as width modulation of respective first and second periodic grooves of fixed depth of said record extending across said record at respective angles measured in first and second directions from the direction of travel of said record, said first periodic grooves disposed at an angle to said second periodic grooves, comprising:

a light source;

means for forming said light into first and second relatively narrow beam portions, the elongated transverse cross sections of said beam portions having an angle between each other corresponding to the angle between said first and second periodic grooves of said record;

means for directing said light to a plane;

means for moving said record in said plane;

light detecting means for detecting light diffracted by said first and second sound channels for producing electrical signals corresponding to said diffracted light; and means for separating sound information portions of said signals from portions of said signals representative of said first and second periodic grooves of said record.

10. Apparatus for producing electrical signals corresponding to video and audio information contained in a record, said audio information being contained in a portion of said record adjacent video portions and comprising width modulation of periodic fixed depth grooves extending generally in a direction of the width of said sound record portion at an angle to the direction of movement of said record, comprising:

a light source;

means for moving said record relative to said light source;

means for directing a first portion of said light for illuminating video portions of said record whereby video information is contained in light diffracted by said record;

first detecting means disposed for detecting said light diffracted by video portions of said record for producing electrical signals corresponding to video information contained in said record;

means for directing a second portion of said light for illuminating said audio information portion of said record whereby audio information is contained in light diffracted by said record;

second detecting means disposed for detecting said light diffracted by audio portions of said record and for producing electrical signals corresponding to said light; and means coupled to said detecting means for separating audio information signals corresponding to said width modulation of said periodic grooves from signals corresponding to the periodic portions of said sound record.

11. Apparatus for producing electrical signals corresponding to video and audio information contained in a record according to claim 10, wherein said record is a flexible transparent tape and said periodic grooves of said audio portion of said tape have a frequency of occurrence greater than the highest frequency of said audio information constituting the width modulation of said periodic grooves.

12. Apparatus for producing a sound record, wherein said sound record is comprised of sound information contained as width modulation of periodic fixed depth grooves, comprising:

a source of audio signals;

a source of carrier waves;

modulation means coupled to said audio signal and carrier wave source for producing a wave comprising said carrier wave pulse width modulated by said audio signals;

a light source;

an electro-optical modulator disposed to intercept light from said light source;

means coupling said pulse width modulated wave to said modulator for controlling the light passing through said modulator in accordance with said pulse width modulated wave; and means for directing said light passing through said modulator to a plane suitable for containing a light sensitive medium whereby said pulse width modulated light is recorded on said medium.

* * * * *